United States Patent
Worthington

(10) Patent No.: US 7,412,110 B1
(45) Date of Patent: Aug. 12, 2008

(54) USING FORWARD AND BACKWARD KERNELS TO FILTER IMAGES

(75) Inventor: John W. Worthington, Minnetonka, MN (US)

(73) Assignee: Adobe Systems Incorporated, San Jose, CA (US)

( * ) Notice: Subject to any disclaimer, the term of this patent is extended or adjusted under 35 U.S.C. 154(b) by 678 days.

(21) Appl. No.: 10/767,385

(22) Filed: Jan. 28, 2004

(51) Int. Cl.
*G06K 9/64* (2006.01)
*G06K 9/36* (2006.01)

(52) U.S. Cl. ...................... 382/279; 382/276
(58) Field of Classification Search .............. 382/279, 382/261, 260, 254, 232; 162/198; 365/429; 375/233, 350
See application file for complete search history.

(56) References Cited

U.S. PATENT DOCUMENTS

| | | | | |
|---|---|---|---|---|
| 5,541,658 | A | 7/1996 | Ushiwata | 348/394.1 |
| 5,615,243 | A | 3/1997 | Chang et al. | 378/37 |
| 6,215,496 | B1 * | 4/2001 | Szeliski et al. | 345/419 |
| 6,457,032 | B1 | 9/2002 | Silver | 708/315 |
| 6,556,696 | B1 | 4/2003 | Summers et al. | 382/128 |
| 6,704,049 | B1 | 3/2004 | Fossum | 348/272 |
| 6,728,416 | B1 * | 4/2004 | Gallagher | 382/265 |
| 6,765,589 | B1 | 7/2004 | Georgiev et al. | 345/646 |
| 6,791,540 | B1 * | 9/2004 | Baumberg | 345/419 |
| 7,098,932 | B2 | 8/2006 | Georgiev et al. | 345/647 |
| 7,171,436 | B2 * | 1/2007 | Egelmeers et al. | 708/322 |
| 2003/0095693 | A1 * | 5/2003 | Kaufman et al. | 382/128 |
| 2003/0169944 | A1 * | 9/2003 | Dowski et al. | 382/279 |
| 2003/0197877 | A1 * | 10/2003 | Lee | 358/1.9 |
| 2005/0025378 | A1 * | 2/2005 | Maurer | 382/260 |

OTHER PUBLICATIONS

Frishchluft. http://www.frischluft.com/; home; Lenscare; printed Jan. 16, 2004 (8 pages).
IrisFilter: http://www.reiji.net/iris-e/index.html, Title, Introduction, printed Jan. 16, 2004 (5 pages).

* cited by examiner

*Primary Examiner*—Jingge Wu
*Assistant Examiner*—Amara Abdi
(74) *Attorney, Agent, or Firm*—Fish & Richardson P.C.

(57) ABSTRACT

Methods and apparatus, including computer program products, for filtering an image including a plurality of pixels. A forward kernel centered at a first pixel in the image is received. The forward kernel assigns forward weights to pixels in a neighborhood surrounding the first pixel. A backward kernel centered at a second pixel within the neighborhood surrounding the first pixel is specified based on a local attribute of the image at the second pixel. The backward kernel assigns backward weights to pixels in a neighborhood surrounding the second pixel. A convolution weight of the second pixel is determined based on the backward kernel and the forward kernel. The convolution weight and a pixel value of the second pixel are used to generate a new value of the first pixel.

50 Claims, 3 Drawing Sheets

USING FORWARD AND BACKWARD KERNELS TO FILTER IMAGES

BACKGROUND

The present invention relates to image processing.

An electronic image, such as a digital image, can be represented by an array of closely packed pixels that are basic picture elements. Each pixel represents a local portion of the image and alone or together with other pixels determines local attributes for the image portion. For example, the local attributes include graphical attributes, such as color, gray level, luminosity or transparency.

The local attributes of a pixel can also include a depth value corresponding to a distance between the object represented by the pixel and a reference point defined by a focal distance at which an object is in focus when it is imaged by a conventional or digital camera. The optics of the camera maps objects at the focal distance to a focal plane defined by the film of the conventional camera or the sensor array of the digital camera. Objects that are closer or farther away than the focal distance are mapped in front of, or behind the focal plane and may appear blurred in the photograph. For a digital image, the depth values of the pixels can be arbitrarily defined or altered by a user of a computer application.

Electronic images can be generated or processed by graphical software applications, such as presentation, animation, painting and design applications, or electronic devices such as scanners and digital cameras. During image processing, different electronic filters can be used to adjust the image. In general, a filter is defined by a transformation applied to pixel values of a received image to generate an output image. Electronic filters can achieve various visual effects. Some electronic filters mimic conventional photographic filters such as lenses and apertures that blur, sharpen or otherwise transform images. Other filters transform images in unusual ways. For example, a pointillism filter transforms a digitized photograph into a pointillistic painting in which small strokes of color are applied so that from a distance the strokes blend together to represent objects in the painting.

A traditional filtering effect is depth of field filtering that changes the depth in which objects seem to be in focus even though they are closer or farther away than the focal distance. A large depth of field implies that objects seem to be in focus even at distances that are much larger or smaller than the focal distance. A small depth of field implies that only objects at, or near the focal distance seem to be in focus and other objects seem blurred. To narrow a large depth of filed electronically, a blur filter can be selectively applied to different portions of a digital image. No blur is applied to image portions representing objects at the focal distance, and the closer or farther away an object is than the focal distance, the more blur is applied to the image portion representing that object.

Typically, a filter uses a kernel to generate a new value for a pixel, whose location is referred to as the center of the kernel. The kernel is defined by weights assigned to pixels in a neighborhood surrounding the center of the kernel in the image. The set of pixels that have substantially non-zero weights is referred to as the kernel's support. When the filter is applied, a new value is generated for the pixel at the center such that each pixel in the kernel's support contributes to the new pixel value in proportion to the weight assigned to the pixel by the kernel.

SUMMARY

To generate a new value for a current pixel, a filter uses a forward kernel centered at the current pixel and backward kernels that are centered at neighborhood pixels in the support of the forward kernel. In general, in one aspect, the invention provides methods and apparatus, including computer program products, for filtering an image including a plurality of pixels. A forward kernel centered at a first pixel in the image is received. The forward kernel assigns forward weights to pixels in a neighborhood surrounding the first pixel. A backward kernel centered at a second pixel within the neighborhood surrounding the first pixel is specified based on a local attribute of the image at the second pixel. The backward kernel assigns backward weights to pixels in a neighborhood surrounding the second pixel. A convolution weight of the second pixel is determined based on the backward kernel and the forward kernel. The convolution weight and a pixel value of the second pixel are used to generate a new value of the first pixel.

Particular implementations can include one or more of the following features. Determining the convolution weight of the second pixel can include determining a forward weight assigned to the second pixel by the forward kernel, determining a backward weight assigned to the first pixel by the backward kernel, and using the forward weight and the backward weight to determine the convolution weight of the second pixel. The forward weight and the backward weight can be multiplied to determine the convolution weight of the second pixel. Or the value of the convolution weight can be set to the smaller of the forward weight and the backward weight. A substantially zero value can be specified for the convolution weight of the second pixel if the backward kernel assigns a substantially zero backward weight to the first pixel. A substantially non-zero value can be specified for the convolution weight of the second pixel if the backward kernel assigns a substantially non-zero backward weight to the first pixel. The non-zero value for the convolution weight of the second pixel can be a predetermined value or a forward weight assigned to the second pixel by the forward kernel.

The local attribute of the image at the second pixel can be a depth value corresponding to a distance of an object represented by the second pixel relative to a focal distance. User input can be received to specify a depth map assigning a depth value to each pixel in the image. The local attribute of the image at the second pixel can be a luminance value. The received forward kernel can be operable to blur or sharpen the image at the first pixel. The specified backward kernel can be operable to blur the image at the second pixel. Receiving the forward kernel centered at the first pixel can include receiving an array of forward weights or a kernel function. In the array of forward weights, each forward weight is assigned to a pixel in the neighborhood surrounding the first pixel. The kernel function has a kernel location at the first pixel and specifies a forward weight to each pixel in the neighborhood surrounding the first pixel based on a distance between the kernel location and the pixel in the neighborhood. The kernel function can depend upon a kernel radius. Specifying the backward kernel centered at the second pixel can include determining a kernel radius based on the local attribute of the image at the second pixel and specifying the backward kernel by the kernel function with the determined kernel radius and a kernel location at the second pixel.

One or more further backward kernels can be specified, where each of the further backward kernels is centered at a corresponding further pixel within the neighborhood surrounding the first pixel and assigns backward weights to pixels in a neighborhood surrounding the corresponding further pixel. Each of the further backward kernels can be based on a local attribute of the image at the corresponding further pixel. A convolution weight of each further pixel can be determined based on the corresponding backward kernel and the forward kernel. The convolution weight and a pixel value of each further pixel can be used to generate the new value of the first pixel.

In general, in another aspect, the invention provides methods and apparatus, including computer program products, for depth of field filtering an image including a plurality of pixels. A plurality of forward kernels is specified. Each of the forward kernels is centered at a corresponding center pixel in the plurality of pixels, and is based on a depth value assigned to the corresponding center pixel. For each of the forward kernels, convolution weights are determined for neighborhood pixels within a neighborhood surrounding the center pixel of the forward kernel. Each neighborhood pixel's convolution weight is determined based on the forward kernel and a backward kernel that is centered at the neighborhood pixel and is based on a depth value assigned to the neighborhood pixel. The image is blurred at each center pixel of the forward kernels using the convolution weights and pixel values of the neighborhood pixels within the neighborhood surrounding the center pixel.

The invention can be implemented to realize one or more of the following advantages. By using forward and backward kernels, a filter's kernel can be modified based on variations of a local attribute of the image within the kernel's support. Thus the modified filter kernel is different when used to filter the image at different locations. Modifications of the filter kernel can be based on variations of luminosity or any other local attribute of the image. For example, a depth of field filter's blur kernel can be modified based on variations of depth values of pixels. The forward and backward kernels can be used to avoid undesirable effects, such as "color leakage" during depth of field filtering. Thus an image portion representing objects that are closer or farther away than the focal distance can be blurred without color contributions from in-focus objects represented by image portions that are close to the blurred portion in the image. The forward and backward kernels can be used to locally modify kernels of Gaussian, sharpening, noise or any other filters.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
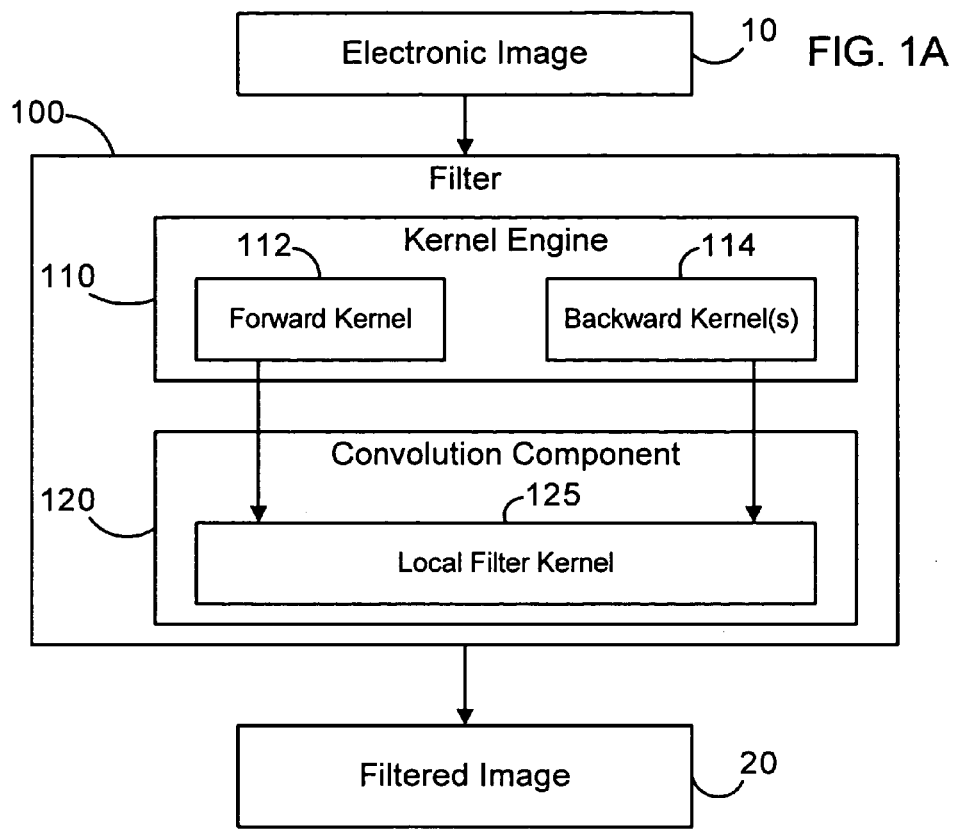
FIG. 1A is a schematic diagram illustrating a filter using forward and backward kernels.

FIG. 1A illustrates a filter 100 that receives an electronic image 10 and transforms the image 10 into a filtered image 20. To perform the transformation, the filter 100 uses kernels to generate new graphical attributes for one or more locations in the image 10. For example, the new graphical attributes can include new values for color components, luminance or both. In one implementation, the filter 100 includes a depth of field filter that blurs different portions of the image 10 based on depth values associated with the image portions. In alternative implementations, the filter 100 can include a sharpening filter, a noise filter or any other filter that uses kernels to transform local attributes of the received image.

The electronic image 10 and the filtered image 20 include an array of pixels, where each pixel represents local attributes of a portion of the corresponding image. In one implementation, the image 10 is a digital image in which pixel attributes are specified by numerical values in a bitmap, and the filter 100 is implemented in one or more software applications or as a plug-in to a software application.

The filter 100 can also be implemented in hardware of electronic devices such as image capturing or displaying devices that process electronic images. For example, the filter 100 can be implemented in digital cameras, CCD devices, scanners, or portable displaying devices such as personal digital assistants or mobile phones. For portable devices, the filter 100 or portions of it can be implemented on a remote server. In electronic devices, the electronic image 10 can be specified by digital or analog electronic signals. The analog electronic signals can be digitized before processing the image. Or the filter 100 or portions of it can be implemented by analog data processing apparatus.

The filter 100 includes a kernel engine 110 and a convolution component 120. The kernel engine 110 specifies kernels for the convolution component 120. The convolution component 120 uses the specified kernels to determine new values for pixels in the image 10. The filter 100 generates the filtered image 20 using the new values of the pixels.

To generate a new value for a current pixel in the image 10, the kernel engine 110 specifies a forward kernel 112 and one or more backward kernels 114. The forward kernel 112 has a center at the current pixel and assigns a forward weight to each pixel in a neighborhood surrounding the current pixel in the image 10. The pixels with substantially non-zero forward weights define a support of the forward kernel 112. For each neighborhood pixel in the support of the forward kernel, the kernel engine 110 specifies a backward kernel 114 that is centered at the neighborhood pixel. Based on the forward weights and the backward kernels 114, the kernel engine 110 specifies a local filter kernel 125. The convolution component 120 uses the local filter kernel 125 to generate a new value for the current pixel.

In one implementation, the forward kernel 112 is defined by forward weights arranged in a two-dimensional array in which each element corresponds to a pixel in a rectangular neighborhood that surrounds the center of the forward kernel 112. For example, the array can correspond to a square neighborhood surrounding the center of the forward kernel 112. The center of the kernel defines the image location for which new attributes are determined using the kernel, and can be located at or away from a geometrical center of the neighborhood defined by the array. In the array, substantially non-zero forward weights define the support of the forward kernel 112. Thus the support's shape is not defined by the shape of the neighborhood, and can have a substantially circular or any other shape about the center of the forward kernel 112.

In alternative implementations, the forward kernel 112 can be defined by a kernel function. The kernel function defines a weight of a pixel in the image 10 based on a relative position between the pixel and the center of the forward kernel 112. For example, a blur kernel can be specified by a step function that defines substantially uniform weights for pixels that are closer to the center of the kernel than a kernel radius, and substantially zero weights for pixels that are farther away. Or a Gaussian kernel is specified by a Gaussian function that defines continuously decreasing weights for pixels that are farther and farther away from the center of the kernel.

The backward kernels 114 are centered at neighborhood pixels inside the support of the forward kernel 112. Each of the backward kernels 114 assigns backward weights to pixels in a neighborhood surrounding the center of the backward kernel, and the substantially non-zero backward weights define the support of the backward kernel. Similar to the forward kernel 112, the backward kernels 114 are defined by two-dimensional arrays of weights or a kernel function. In one implementation, the backward kernels 114 correspond to the same type of filter as the forward kernel 112, but have different supports. For example, the forward kernel 112 and the backward kernels 114 are blur kernels having circular kernel supports, and the radius of each kernel's support depends on a local attribute at the center of that kernel. For depth of field filtering, the local attribute includes a depth value representing a distance relative to the focal distance. For filters related to brightness or contrast, the local attribute can include luminosity. In alternative implementations, the backward kernels 114 correspond to a filter type that is different from the type of the forward kernel 112.

The kernel engine 110 generates a local filter kernel 125 based on the forward kernel 112 and the backward kernels 114. The local filter kernel 125 is centered at the current pixel at the center of the forward kernel 112, and assigns convolution weights to pixels in a neighborhood surrounding the current pixel. The substantially non-zero convolution weights define a support of the local filter kernel 125. In one implementation, the support of the local filter kernel 125 is a subset in the support of the forward kernel 112. For example, the support of the local filter kernel 125 is generated by selecting pixels from the support of the forward kernel 112. An example of selecting pixels for the support of the local filter kernel 125 is discussed below with reference to FIG. 1B. Or the local filter kernel 125 can be generated by determining the convolution weights using the corresponding forward weights without explicitly identifying the support of the local filter kernel 125. In alternative implementations, the support of the local filter kernel 125 can include pixels that are outside the support of the forward kernel 112.

The local filter kernel 125 includes convolution weights that are based on predetermined values, forward weights or backward weights. For blurring the image 10 at the current pixel, substantially uniform weights are assigned to pixels in the support of the local filter kernel 125. Alternatively, the convolution weights can be generated by modifying the forward weights of the forward kernel 112 based on backward weights that the backward kernels 114 assign to the center of the forward kernel 112. Methods for assigning weights for the local filter kernel are further discussed with reference to FIGS. 2 and 3.

The convolution component 120 uses the local filter kernel 125 to generate one or more new values for the current pixel in the filtered image 20. The new pixel values can include new values for luminance, gray level or one or more color components such as red ("R"), green ("G") or blue ("B") components. The convolution component 120 determines the new values of the current pixel based on the convolution weights and values of pixels within the support of the local filter kernel 125. For blurring, the convolution component 120 uses substantially uniform convolution weights to average the red, green or blue values of pixels within the support of the local filter kernel 125, and sets the new value of the current pixel to the average value.

Figure 1B:
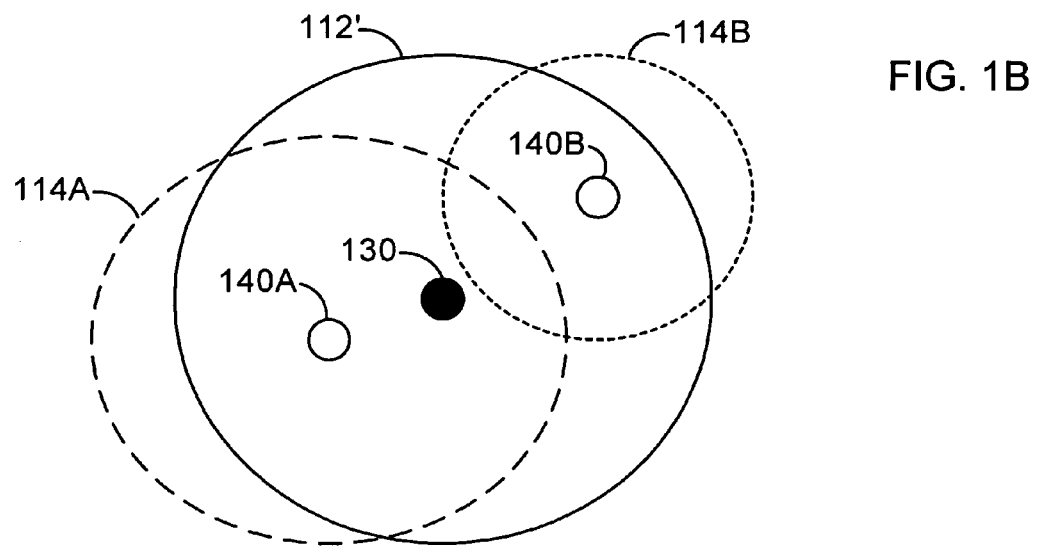
FIG. 1B is a schematic diagram illustrating exemplary forward and backward kernels.

FIG. 1B illustrates an exemplary implementation of generating the local filter kernel 125 based on a forward kernel 112' and backward kernels 114A and 114B. In this implementation, the support of the local filter kernel 125 includes pixels selected from the support of the forward kernel 112'. The forward kernel 112' is centered at a pixel 130 and has a substantially circular support. Inside the support of the forward kernel 112', neighborhood pixels 140A and 140B are the centers of the backward kernels 114A and 114B, respectively.

The support of the backward kernel 114A includes the center of the forward kernel 112', which is at the pixel 130. Accordingly, the neighborhood pixel 140A at the center of the backward kernel 114A is selected for the support of the local filter kernel 125. Thus the local filter kernel 125 assigns a substantially non-zero convolution weight to the neighborhood pixel 140A. In one implementation, the non-zero convolution weight has a predetermined value such as one. Or the convolution weight is based on a forward weight assigned to the neighborhood pixel 140A by the forward kernel 112', or a backward weight assigned to the pixel 130 by the backward kernel 114A, or both. For example, the convolution weight can include the product of the forward and backward weights.

The support of the backward kernel 114B does not include the pixel 130. Thus the neighborhood pixel 140B is not selected for the support of the local filter kernel 125. That is, the local filter kernel 125 assigns a substantially zero weight to the neighborhood pixel 140B. Accordingly when the convolution component uses the local filter kernel 125 to determine a new value for the pixel 130, the neighborhood pixel 140B has substantially zero contribution to the new value.

In depth of field filtering, the kernels 112', 114A and 114B are blur kernels and have support with different kernel radii that depend on the depth values at their center. The pixel 130 has the largest depth value and kernel radius, and the neighborhood pixels 140A and 140B have smaller and smaller depth values and kernel radii. The neighborhood pixel 140A is close to the pixel 130 both in the image 10 and according to the depth values. Thus as expected for optical depth of field filtering, the neighborhood pixel 140A contributes to blurring the image at the pixel 130. The neighborhood pixel 140B is also close to the pixel 130 in the image 10 but has a substantially smaller depth value indicating that the object represented by the pixel 140B is much closer to the focal distance than the object represented by the pixel 130. In accordance with optical depth of field filtering, the local filter kernel 125 is constructed such that the neighborhood pixel 140B does not contribute to blurring the image at the pixel 130. Thus the local filter kernel 125 prevents color leakage from the neighborhood pixel 140B to the pixel 130.

Figure 2:
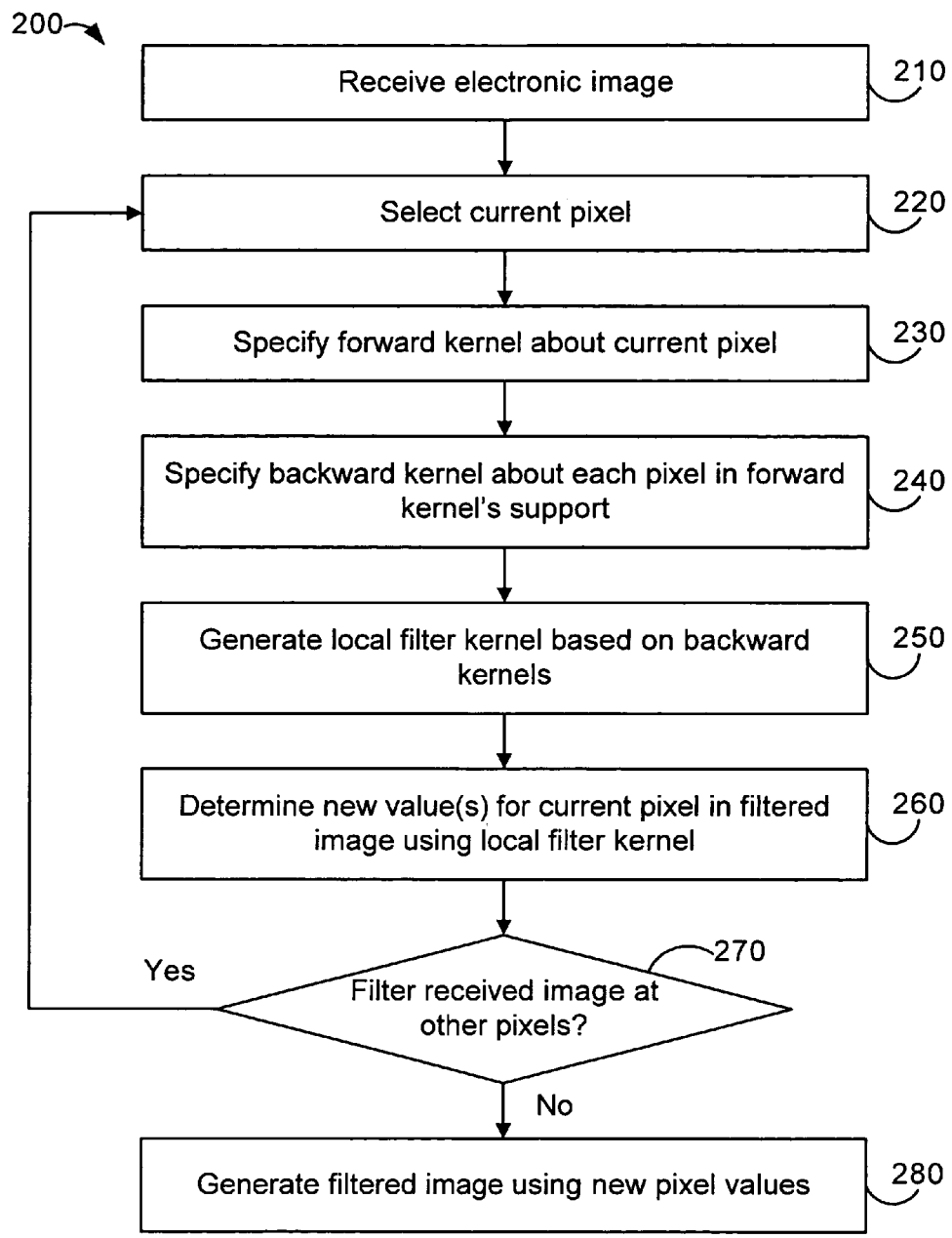
FIGS. 2-4 are schematic flow diagrams illustrating methods for using forward and backward kernels.

FIG. 2 illustrates a method 200 for using forward and backward kernels to adjust images. The method 200 can be performed by a system that includes the filter 100 (FIG. 1A). In one implementation, the system includes a depth of field filter specifying different sized blur kernels whose size depends upon the depth values in the image. Alternatively, the system can include a filter that uses kernels for sharpening or adjusting luminance or any other graphical attribute of the images.

The system receives an electronic image including multiple pixels (step 210). Each pixel specifies one or more attributes of a corresponding portion of the image. For example, the received image is a digital image specified by pixel values in a bitmap. Or each pixel in the received image can be specified by a corresponding analog electronic signal.

The system selects a current pixel in the received image (step 220). The current pixel is selected to generate one or more new values for the current pixel in a filtered image. In a digital image defined by a bitmap, the current pixel can be selected according to a predetermined order in the bitmap. Or the bitmap can be processed in parallel using multiple filtering units, where each unit selects a corresponding pixel in the received image. If filtering units are pre-assigned, for example hard wired to particular pixels, no pixel selection is required for such units.

The system specifies a forward kernel about the current pixel (step 230). The forward kernel assigns forward weights to pixels in a neighborhood surrounding the current pixel, which is the center of the forward kernel. Pixels that have substantially non-zero forward weights define the support of the forward kernel in the received image. In one implementation, the forward kernel is specified based on one or more local attributes of the received image at the current pixel. For depth of field filtering, the size of the forward kernel's support is specified based on a depth value of the current pixel in the received image. Alternatively, the specified forward kernel can be a predetermined kernel that is independent from attributes of the received image.

To blur the received image at the current pixel, substantially uniform forward weights are assigned to all pixels in the support of the forward kernel. The uniform forward weights can have a value of about one, or a value that is normalized based on the size of the support. Near the edge of the support, the forward weights can have a smaller value than the value of the uniform weights. The smaller values can achieve anti-aliasing effects for forward kernels that have small supports. For larger supports, the system can specify the forward kernel by the uniform weights only, without decreasing the forward weights near the edge. Thus processing of the received image can be simplified.

In one implementation, the forward kernel's support has a predetermined shape, such as a circle or a square centered at the current pixel, and the size of the kernel is specified based on a local attribute, such as a depth value of the current pixel. Alternatively, the forward kernel's support can be specified by forward weights that are based on a local attribute of the current pixel. For example, the forward kernel can be specified by a kernel function that defines substantially zero or non-zero forward weights for pixels in a neighborhood of the current pixel based on their distance from the current pixel. The kernel function can be a step function, a Gaussian or an exponential function with one or more function parameters that depend on a value of the current pixel. Accordingly, such a kernel function defines the forward kernel and a corresponding circular support based on the value of the current pixel.

The system specifies a backward kernel about each pixel in the forward kernel's support (step 240). That is, each backward kernel is defined to have a center at a pixel within the forward kernel's support. Each backward kernel assigns backward weights to pixels in a neighborhood surrounding the center of the backward kernel. Pixels that have substantially non-zero backward weights define the support of the backward kernel in the received image. Each backward kernel is specified based on one or more local attributes of the received image at the center of the backward kernel. For depth of field filtering, backward kernels are specified based on a depth value of a neighborhood pixel at the center of the backward kernel in the received image.

In one implementation, the backward kernels are the same type of kernels as the forward kernel. For example, the forward kernel and the backward kernels are blur kernels, where each blur kernel's support has a circular shape and a kernel radius that is specified for the circular support based upon a depth value at the center of the blur kernel. Kernel supports can also have a square shape or any other predetermined shape. Or the forward and backward kernels can be specified with the same type of function, such as a Gaussian function, where one or more parameters of the function depend on a local attribute at the center of the corresponding kernel.

In alternative implementations, the forward and backward kernels can be of different types. For example, the forward kernel can be for sharpening and the backward kernels for blurring. Or the backward kernels can have supports whose predetermined shape is different from the shape of the forward kernel's support. Or the backward kernels can be specified with one type of kernel function, for example a Gaussian function, and the forward kernel with another type of kernel function, for example an exponential function.

In one implementation, each backward kernel is specified by a kernel radius defining the backward kernel's support. Such backward kernels assign substantially uniform backward weights within their support and substantially zero backward weights elsewhere. Optionally the backwards weights can have intermediate values near the edge of the backward kernel. In alternative implementations, each backward kernel can be specified by an array of backward weights or by a kernel function.

The system generates a local filter kernel based on the backward kernels (step 250). The local filter kernel is centered at the current pixel and specifies convolution weights for pixels within a neighborhood surrounding the current pixel in the received image. The substantially non-zero convolution weights define the support of the local filter kernel. In one implementation, the system defines the local filter kernel by an array of convolution weights assigned to pixels in the neighborhood surrounding the current pixel. Alternatively, the system can use a kernel function to specify the convolution weights in the local filter kernel's support, which can be identified separately in an array or a list.

In one implementation, the system generates the local filter kernel by first selecting backward kernels whose support includes the current pixel, and defining the support of the local filter kernel to include the pixels at the center of the selected backward kernels. Next, the convolution weights within the support of the local filter kernel are defined to have predetermined values, such as a value of about one. Optionally, the predetermined values can be smaller near the edge of the support of the local filter kernel. In alternative implementations, values for the convolution weights are determined based on forward or backward weights, as discussed in more detail below with reference to FIG. 3.

The system determines one or more new values for the current pixel in a filtered image using the local filter kernel (step 260). In one implementation, the local filter kernel assigns a convolution weight ("$W_i$") for each pixel ($i=1, \ldots, n$) in a neighborhood surrounding the current pixel in the received image. The convolution weights $W_i$ are normalized such that the sum of all the convolution weights $W_i$ is about one. A pixel in the neighborhood defines a value of a local attribute ("$LA_i$") of the received image at the pixel. For example, the local attribute $LA_i$ can be a luminance value or a color component such as a red, green or blue component. The system determines a new value ("NA") of the local attribute at the current pixel for the filtered image as $$NA=\Sigma_i W_i LA_i. \qquad (Eq.\ 1)$$

Alternatively, the right hand side of Eq. 1 can be normalized with the sum $\Sigma_i |W_i|$ if this sum is different from one.

The system decides whether the received image should be filtered at other pixels (decision 270). For example, the filtering can be performed at all pixels of the received image according to a predetermined sequence, and the system can determine whether the end of the predetermined sequence is reached. Optionally, the system can receive user input selecting an image portion of the image to be filtered, and the system verifies whether filtering has been performed at all pixels in the selected portion. If filtering is required at other pixels ("Yes" branch of decision 270), the system selects another current pixel (that is, returns to step 220). If no further filtering is required ("No" branch of decision 270), the system generates the filtered image using the new pixel values determined using the local filter kernel (step 280).

Figure 3:
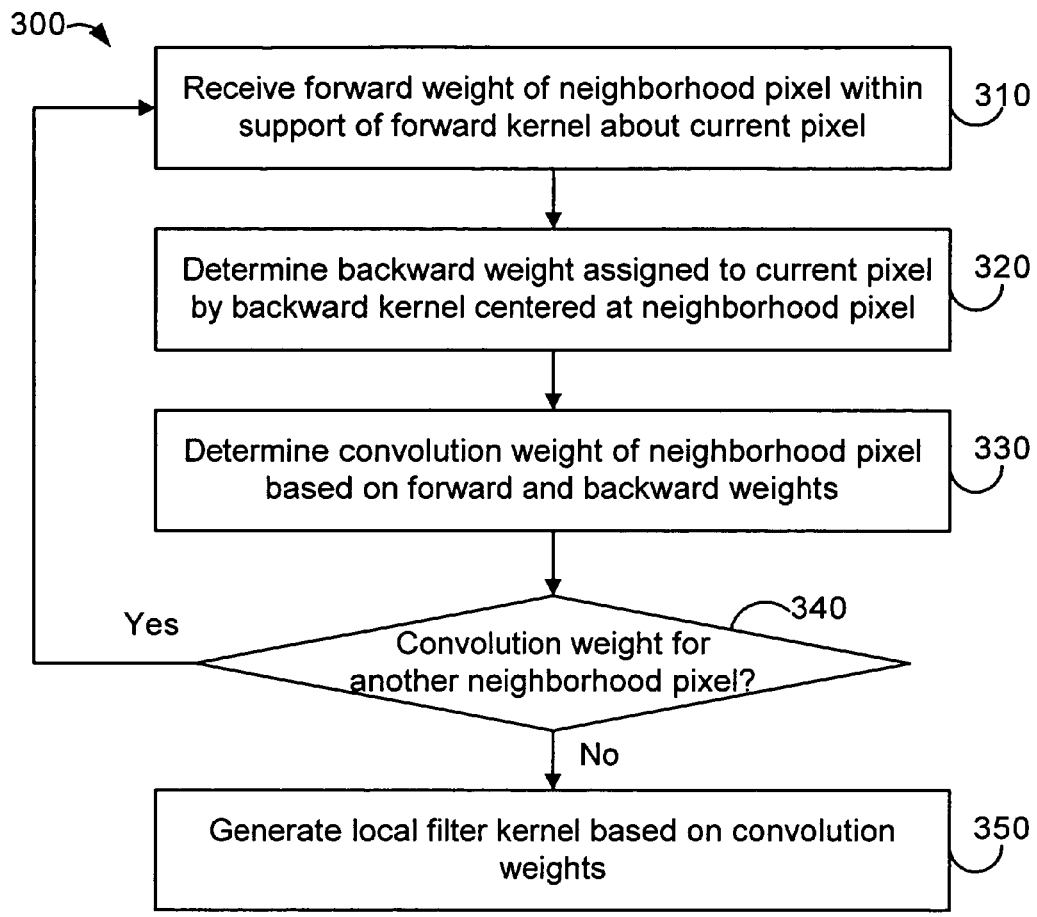

FIG. 3 illustrates a method 300 for defining a local filter kernel using forward and backward weights. The method 300 can be performed by a system that includes the filter 100 (FIG. 1A).

The system receives a forward weight assigned to a neighborhood pixel by a forward kernel about a current pixel (step 310). The forward kernel is centered at the current pixel and assigns the forward weight to the neighborhood pixel. The neighborhood pixel can be inside or outside the support of the forward kernel. The received forward weight can correspond to a standard filter, or can be generated from a weight of a standard filter. For example, the forward weight can be a square root of the weight of the standard filter. The standard filter can be a blur filter, a Gaussian filter or any other filter that uses kernels.

The system determines a backward weight assigned to the current pixel by a backward kernel that is centered at the neighborhood pixel (step 320). The backward kernel is based on a depth value or another local attribute at the neighborhood pixel. The backward kernel assigns the backward weight to the current pixel using a kernel function or an array of backward weights. The system can use the kernel function or the array to determine the backward weight assigned to the current pixel. In one implementation, the backward kernel is specified by a kernel radius defining the backward kernel's support and substantially uniform backward weights inside the support. To determine the backward weight assigned to the current pixel, the system can determine whether the backward kernel's support includes the current pixel. If the current pixel is outside the backward kernel's support, a substantially zero value is assigned to the current pixel. If the current pixel is inside the backward kernel's support, a value of the substantially uniform backward weight is assigned to the current pixel by the backward kernel. Similar to the forward weights, the backward weights can correspond to a standard filter. For example, the backward weight can have a value of the square root of a corresponding weight of the standard filter.

The system determines a convolution weight of the neighborhood pixel based on the forward and backward weights (step 330). In one implementation, the convolution weight is determined by multiplying the forward weight and the backward weight. Alternatively, the convolution weight can be the smaller of the forward and backward weights. Thus the convolution weight is substantially zero for a substantially zero value of the backward weight or the forward weight. This happens when the current pixel is outside the support of the backward kernel or the neighborhood pixel is outside the support of the forward kernel.

The convolution weight can be based on weights in a standard filter. If the forward and backward weights are multiplied, the forward weight can have a value of a corresponding weight in the standard filter and the backward weight can have a value of about one. Or the forward and backward weights can be square roots of corresponding weights of the standard filter, such as a standard depth of field filter. The product of the square roots provides a convolution weight with a value of the standard depth of field filter when the current pixel and the neighborhood pixel have substantially the same depth value. If the convolution weight is determined by selecting the smaller of the forward and backward weights, the backward and forward weights can have values corresponding to weights in the standard filter.

The system determines whether a convolution weight should be determined for another neighborhood pixel (decision 340). If another convolution weight is required ("Yes" branch of decision 340), the system performs another iteration in which the system receives a forward weight (step 310) and determines corresponding backward and convolution weights (steps 320 and 330). For example, the system can perform one iteration for each neighborhood pixel in the forward kernel's support. If the forward kernel is specified by an array of forward weights, the iteration can be repeated for each element in the array.

If no more convolution weights are required ("NO branch of decision 340), the system generates a local filter kernel based on the determined convolution weights (step 350). The local filter kernel is centered at the current pixel and assigns convolution weights to pixels in a neighborhood of the current pixel. In one implementation, the local filter kernel is generated by arranging the determined convolution weights in an array such that each convolution weight is associated in the array with the corresponding neighborhood pixel. If the forward kernel is specified by an array of forward weights, the array of convolution weights can have the same structure as the array of forward weights. For example in a copy of the forward kernel, the system can replace the forward weight of each neighborhood pixel with the convolution weight determined for the neighborhood pixel. Optionally, the convolution weights can be normalized such that the sum of all weights in the local filter kernel is a predetermined number, such as about one.

Figure 4:
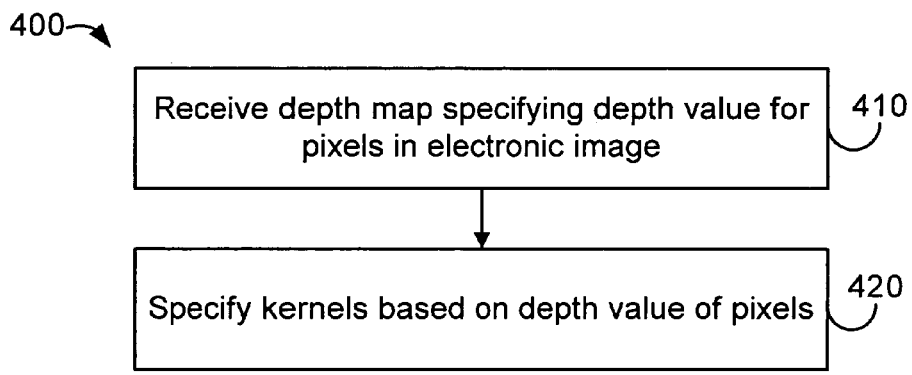

FIG. 4 illustrates a method 400 for specifying forward and backward kernels for a depth of field filter. A depth map is received for an electronic image including multiple pixels (step 410). For each pixel in the image, the depth map specifies a depth value indicating a distance of the object represented by the pixel relative to the focal distance. The depth map can be specified based on user input. For example in a graphical user interface ("GUI"), painting tools or edge detecting tools can be used to identify one or more image portions which have substantially the same distance relative to the focal distance, and the user can specify corresponding depth values to the identified portions. Or a gradient tool can be used to specify depth values that increase in a particular direction in the image. Alternatively, the depth values can be determined by hardware in an image capturing device.

For each pixel, a kernel is specified based on the depth value of the pixel (step 420). The specified kernel is centered at the corresponding pixel. In one implementation, the kernel is specified by a characteristic size of the kernel's support. For example, the kernel can be specified by a kernel radius that depends on the depth value at the center of the kernel. The larger the depth value at the kernel's center, the larger the kernel radius. The kernel centered at a particular pixel can be used as a forward kernel if a new value is determined for the particular pixel, or a backward kernel if the particular pixel is in the neighborhood of a forward kernel.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method for filtering an image including a plurality of pixels, the method comprising:
   receiving a forward kernel centered at a first pixel in the image, the forward kernel assigning forward weights to pixels in a neighborhood surrounding the first pixel;
   specifying a backward kernel centered at a second pixel within the neighborhood surrounding the first pixel based on a local attribute of the image at the second pixel, the backward kernel assigning backward weights to pixels in a neighborhood surrounding the second pixel;
   determining a first convolution weight of the second pixel based on the backward kernel and the forward kernel, wherein determining the first convolution weight of the second pixel includes,
      determining a forward weight assigned to the second pixel by the forward kernel,
      determining a backward weight assigned to the first pixel by the backward kernel, and
      using the forward weight and the backward weight to determine the first convolution weight of the second pixel by multiplying the forward weight and the backward weight; and
   using the first convolution weight and a pixel value of the second pixel to generate a new value of the first pixel.

2. The method of claim 1, wherein:
   determining the first convolution weight of the second pixel includes setting a value of the first convolution weight to the smaller of the forward weight and the backward weight.

3. The method of claim 1, wherein:
   determining the first convolution weight of the second pixel includes specifying a substantially zero value for the first convolution weight of the second pixel if the backward kernel assigns a substantially zero backward weight to the first pixel.

4. The method of claim 1, wherein:
   determining the first convolution weight of the second pixel includes specifying a substantially non-zero value for the first convolution weight of the second pixel if the backward kernel assigns a substantially non-zero backward weight to the first pixel.

5. The method of claim 4, wherein the non-zero value for the first convolution weight of the second pixel is a predetermined value.

6. The method of claim 4, wherein the non-zero value for the first convolution weight of the second pixel is a forward weight assigned to the second pixel by the forward kernel.

7. The method of claim 1, wherein the local attribute of the image at the second pixel is a depth value corresponding to a distance of an object represented by the second pixel relative to a focal distance.

8. The method of claim 7, further comprising:
   receiving user input specifying a depth map assigning a depth value to each pixel in the image.

9. The method of claim 1, wherein the local attribute of the image at the second pixel is a luminance value.

10. The method of claim 1, wherein:
    the received forward kernel is operable to blur the image at the first pixel.

11. The method of claim 10, wherein:
the specified backward kernel is operable to blur the image at the second pixel.

12. The method of claim 1, wherein:
the received forward kernel is operable to sharpen the image at the first pixel.

13. The method of claim 1, wherein:
receiving the forward kernel centered at the first pixel includes receiving an array of forward weights, each forward weight in the array being assigned to a pixel in the neighborhood surrounding the first pixel.

14. The method of claim 1, wherein:
receiving the forward kernel centered at the first pixel includes receiving a kernel function having a kernel location at the first pixel and specifying a forward weight to each pixel in the neighborhood surrounding the first pixel based on a distance between the kernel location and the pixel in the neighborhood.

15. The method of claim 14, wherein:
the kernel function depends on a kernel radius; and
specifying the backward kernel centered at the second pixel includes determining a kernel radius based on the local attribute of the image at the second pixel and specifying the backward kernel by the kernel function with the determined kernel radius and a kernel location at the second pixel.

16. The method of claim 1, further comprising:
specifying one or more further backward kernels, each of the further backward kernels being centered at a corresponding further pixel within the neighborhood surrounding the first pixel and assigning backward weights to pixels in a neighborhood surrounding the corresponding further pixel, each of the further backward kernels being based on a local attribute of the image at the corresponding further pixel;
determining a second convolution weight of each further pixel based on the corresponding backward kernel and the forward kernel; and
using the second convolution weight and a pixel value of each further pixel to generate the new value of the first pixel.

17. A computer-implemented method for depth of field filtering an image including a plurality of pixels, the method comprising:
specifying a plurality of forward kernels, each of the forward kernels being centered at a corresponding center pixel in the plurality of pixels and being based on a depth value assigned to the corresponding center pixel;
for each of the forward kernels, determining convolution weights of neighborhood pixels within a neighborhood surrounding the center pixel of the forward kernel, each neighborhood pixel's convolution weight being determined based on the forward kernel and a backward kernel that is centered at the neighborhood pixel and is based on a depth value assigned to the neighborhood pixel; and
blurring the image at each center pixel of the forward kernels using the convolution weights and pixel values of the neighborhood pixels within the neighborhood surrounding the center pixel.

18. A software product tangibly embodied in a computer-readable medium, for filtering an image including a plurality of pixels, the software product comprising instructions operable to cause one or more data processing apparatus to perform operations comprising:

receiving a forward kernel centered at a first pixel in the image, the forward kernel assigning forward weights to pixels in a neighborhood surrounding the first pixel;
specifying a backward kernel centered at a second pixel within the neighborhood surrounding the first pixel based on a local attribute of the image at the second pixel, the backward kernel assigning backward weights to pixels in a neighborhood surrounding the second pixel;
determining a first convolution weight of the second pixel based on the backward kernel and forward kernel, wherein determining the convolution weight of the second pixel includes,
determining a forward weight assigned to the second pixel by the forward kernel,
determining a backward weight assigned to the first pixel by the backward kernel, and
using the forward weight and the backward weight to determine the first convolution weight of the second pixel by multiplying the forward weight and the backward weight; and
using the first convolution weight and a pixel value of the second pixel to generate a new value of the first pixel.

19. The software product of claim 18, wherein:
determining the first convolution weight of the second pixel includes setting a value of the first convolution weight to the smaller of the forward weight and the backward weight.

20. The software product of claim 18, wherein:
determining the first convolution weight of the second pixel includes specifying a substantially zero value for the first convolution weight of the second pixel if the backward kernel assigns a substantially zero backward weight to the first pixel.

21. The software product of claim 18, wherein:
determining the first convolution weight of the second pixel includes specifying a substantially non-zero value for the first convolution weight of the second pixel if the backward kernel assigns a substantially non-zero backward weight to the first pixel.

22. The software product of claim 21, wherein the non-zero value for the first convolution weight of the second pixel is a predetermined value.

23. The software product of claim 21, wherein the non-zero value for the first convolution weight of the second pixel is a forward weight assigned to the second pixel by the forward kernel.

24. The software product of claim 18, wherein the local attribute of the image at the second pixel is a depth value corresponding to a distance of an object represented by the second pixel relative to a focal distance.

25. The software product of claim 24, further comprising instructions operable to cause one or more data processing apparatus to perform operations comprising:
receiving user input specifying a depth map assigning a depth value to each pixel in the image.

26. The software product of claim 18, wherein the local attribute of the image at the second pixel is a luminance value.

27. The software product of claim 18, wherein:
the received forward kernel is operable to blur the image at the first pixel.

28. The software product of claim 27, wherein:
the specified backward kernel is operable to blur the image at the second pixel.

29. The software product of claim 18, wherein:
the received forward kernel is operable to sharpen the image at the first pixel.

30. The software product of claim 18, wherein:
receiving the forward kernel centered at the first pixel includes receiving an array of forward weights, each forward weight in the array being assigned to a pixel in the neighborhood surrounding the first pixel.

31. The software product of claim 18, wherein:
receiving the forward kernel centered at the first pixel includes receiving a kernel function having a kernel location at the first pixel and specifying a forward weight to each pixel in the neighborhood surrounding the first pixel based on a distance between the kernel location and the pixel in the neighborhood.

32. The software product of claim 31, wherein:
the kernel function depends on a kernel radius; and
specifying the backward kernel centered at the second pixel includes determining a kernel radius based on the local attribute of the image at the second pixel and specifying the backward kernel by the kernel function with the determined kernel radius and a kernel location at the second pixel.

33. The software product of claim 18, further comprising instructions operable to cause one or more data processing apparatus to perform operations comprising:
specifying one or more further backward kernels, each of the further backward kernels being centered at a corresponding further pixel within the neighborhood surrounding the first pixel and assigning backward weights to pixels in a neighborhood surrounding the corresponding further pixel, each of the further backward kernels being based on a local attribute of the image at the corresponding further pixel;
determining a second convolution weight of each further pixel based on the corresponding backward kernel and the forward kernel; and
using the second convolution weight and a pixel value of each further pixel to generate the new value of the first pixel.

34. A software product tangibly embodied in a machine-readable medium, for depth of field filtering an image including a plurality of pixels, the software product comprising instructions operable to cause one or more data processing apparatus to perform operations comprising:
specifying a plurality of forward kernels, each of the forward kernels being centered at a corresponding center pixel in the plurality of pixels and being based on a depth value assigned to the corresponding center pixel;
for each of the forward kernels, determining convolution weights of neighborhood pixels within a neighborhood surrounding the center pixel of the forward kernel, each neighborhood pixel's convolution weight being determined based on the forward kernel and a backward kernel that is centered at the neighborhood pixel and is based on a depth value assigned to the neighborhood pixel; and
blurring the image at each center pixel of the forward kernels using the convolution weights and pixel values of the neighborhood pixels within the neighborhood surrounding the center pixel.

35. A system for filtering an image including a plurality of pixels, the system comprising:
a filter configured to:
receive a forward kernel centered at a first pixel in the image, the forward kernel assigning forward weights to pixels in a neighborhood surrounding the first pixel;
specify a backward kernel centered at a second pixel within the neighborhood surrounding the first pixel based on a local attribute of the image at the second pixel, the backward kernel assigning backward weights to pixels in a neighborhood surrounding the second pixel;
determine a first convolution weight of the second pixel based on the backward kernel and the forward kernel, wherein to determine the first convolution weight of the second pixel, the filter is further configured to,
determine a forward weight assigned to the second pixel by the forward kernel,
determine a backward weight assigned to the first pixel by the backward kernel, and
use the forward weight and the backward weight to determine the first convolution weight of the second pixel by multiplying the forward weight and the backward weight; and
use the first convolution weight and a pixel value of the second pixel to generate a new value of the first pixel.

36. The system of claim of claim 35, wherein the first convolution weight of the second pixel is determined by setting a value of the first convolution weight to the smaller of the forward weight and the backward weight.

37. The system of claim of claim 35, wherein the first convolution weight of the second pixel is determined by specifying a substantially zero value for the first convolution weight of the second pixel if the backward kernel assigns a substantially zero backward weight to the first pixel.

38. The system of claim of claim 35, wherein the first convolution weight of the second pixel is determined by specifying a substantially non-zero value for the first convolution weight of the second pixel if the backward kernel assigns a substantially non-zero backward weight to the first pixel.

39. The system of claim of claim 38, wherein the non-zero value for the first convolution weight of the second pixel is a predetermined value.

40. The system of claim 38, wherein the non-zero value for the first convolution weight of the second pixel is a forward weight assigned to the second pixel by the forward kernel.

41. The system of claim of claim 35, wherein the local attribute of the image at the second pixel is a depth value corresponding to a distance of an object represented by the second pixel relative to a focal distance.

42. The system of claim of claim 41, wherein the filter is configured to receive user input specifying a depth map assigning a depth value to each pixel in the image.

43. The system of claim of claim 35, wherein the local attribute of the image at the second pixel is a luminance value.

44. The system of claim of claim 35, wherein the received forward kernel is operable to blur the image at the first pixel.

45. The system of claim of claim 44, wherein the specified backward kernel is operable to blur the image at the second pixel.

46. The system of claim of claim 35, wherein the received forward kernel is operable to sharpen the image at the first pixel.

47. The system of claim of claim 35, wherein the forward kernel centered at the first pixel is received by receiving an array of forward weights, each forward weight in the array being assigned to a pixel in the neighborhood surrounding the first pixel.

48. The system of claim of claim 35, wherein the forward kernel centered at the first pixel is received by receiving a kernel function having a kernel location at the first pixel and specifying a forward weight to each pixel in the neighborhood surrounding the first pixel based on a distance between the kernel location and the pixel in the neighborhood.

49. The system of claim of claim 48, wherein the kernel function depends on a kernel radius, and, specifying the backward kernel centered at the second pixel includes determining a kernel radius based on the local attribute of the image at the second pixel and specifying the backward kernel by the kernel function with the determined kernel radius and a kernel location at the second pixel.

50. The system of claim of claim 35, wherein the filter is further configured to:

specify one or more further backward kernels, each of the further backward kernels being centered at a corresponding further pixel within the neighborhood surrounding the first pixel and assigning backward weights to pixels in a neighborhood surrounding the corresponding further pixel, each of the further backward kernels being based on a local attribute of the image at the corresponding further pixel;

determine a second convolution weight of each further pixel based on the corresponding backward kernel and the forward kernel; and use the second convolution weight and a pixel value of each further pixel to generate the new value of the first pixel.

\* \* \* \* \*